(12) United States Patent
Götvall et al.

(10) Patent No.: US 6,643,571 B2
(45) Date of Patent: Nov. 4, 2003

(54) SYSTEM AND METHOD FOR COMMUNICATION BETWEEN VEHICLES AND A SUPERVISOR STATION

(75) Inventors: Per-Lage Götvall, Bollebygd (SE); Per Adamsson, Gothenburg (SE); Jonas Quist, Gothenburg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/063,759

(22) Filed: May 10, 2002

(65) Prior Publication Data

US 2002/0123832 A1 Sep. 5, 2002

Related U.S. Application Data

(63) Continuation of application No. PCT/EP00/11166, filed on Nov. 11, 2000.

(30) Foreign Application Priority Data

Nov. 11, 1999 (SE) ............................................... 9904099

(51) Int. Cl.[7] ................................................. G06F 7/00
(52) U.S. Cl. .......................................... 701/33; 701/29
(58) Field of Search .............................. 701/33, 29, 30, 701/32, 35, 36; 340/7.2, 7.41, 825.69

(56) References Cited

U.S. PATENT DOCUMENTS

| 5,717,387 A | * | 2/1998 | Suman et al. .......... 340/825.31 |
| 5,917,405 A | | 6/1999 | Joao |
| 6,028,537 A | * | 2/2000 | Suman et al. ............... 340/988 |

FOREIGN PATENT DOCUMENTS

| WO | WO 98/21703 A1 | 5/1998 |
| WO | WO 99/56447 A1 | 4/1999 |
| WO | WO 99/22353 A1 | 5/1999 |

* cited by examiner

*Primary Examiner*—Yonel Beaulieu
(74) *Attorney, Agent, or Firm*—Howrey Simon Arnold & White LLP

(57) ABSTRACT

System and method for monitoring and/or operating one or more moving objects, such as vehicles, where each object is assigned an Internet address. The objects also include an interface to the Internet via a wireless communication unit. The objects have sensors and/or actuators for monitoring and/or affecting components and conditions of that object when connected to the interface. By way of a connection with a supervisor station via the Internet, the moving objects can be monitored and adapted using the sensors and actuators.

20 Claims, 4 Drawing Sheets

SYSTEM AND METHOD FOR COMMUNICATION BETWEEN VEHICLES AND A SUPERVISOR STATION

CROSS-REFERENCE TO RELATED APPLICATIONS

The present application is a continuation of International Application No. PCT/EP00/11166, filed Nov. 11, 2000 and published in English pursuant to PCT Article 21(2), now abandoned, and which claims priority to Swedish Application No. 9904099-0, filed Nov. 11, 1999. The disclosures of said applications are expressly incorporated herein by reference in their entirety.

BACKGROUND OF THE INVENTION

1. Technical Field

The invention relates to a system and method for monitoring and/or operating one or more objects and especially for communication between one or more moving objects, like vehicles and at least one supervisor station by means of transmitting and receiving means.

This system and method is especially suitable when provided for exchange of information and data between moving objects like cars, trucks or other vehicles on the one hand, and one or more central stations on the other hand, which are for example a service station of a manufacturer or a headstation for guiding or operating the vehicles. Further, the system and method is suitable and provided for communication with facilities and plants in remote areas which are operated, controlled, observed or monitored from one or more central stations.

2. Background Art

The development of vehicles is a very time consuming process. A considerable part of the lead time for a vehicle project is the time for testing components and the complete vehicle. These tests are affected with efficiency problems of different kinds. During the operation of such vehicles, there is no possibility to supervise the test and to verify the quality of the test or to check the quality of the data before the vehicles return to the related station. Further, there is no possibility to change the test setup during operation in response to certain operating conditions like oil temperature or fuel consumption or in response to changing weather conditions like high or low temperatures. In such cases, the vehicles have to return to the central station and the test setup has to be adapted accordingly. Further, it takes a long time between data acquisition and validation. All this has to be done for a plurality of vehicles at the same time which is often difficult to handle and requires a costly organization.

A similar problem is imposed when several vehicles are operated in normal use for example by a haulage or cargo agency. Routes must be planned in dependency of the places where goods or products have to be picked up and places where such goods or products have to be delivered. Further, especially if these routes lead through remote and sparsely settled areas, they must be carefully planned under consideration of the current position of each vehicle and of the operating conditions of each vehicle like fuel and oil consumption, maintenance intervals and possible failure of a vehicle component.

SUMMARY OF INVENTION

Consequently, it is a first object of the invention to make development of vehicles (or other moving objects) easier and faster with respect to the time necessary for testing the vehicle and its components.

It is a second object of the invention to make operation of one or more vehicles (or other moving objects) more efficient and economical by increasing availability and minimizing or eliminating the time necessary for interruption of operation for the purpose of maintenance and/or taking fuel.

It is a further object of the invention to provide a system and method for communication between at least one moving object like a vehicle and at least one supervisor station by means of transmitting and receiving means, by which testing, checking, monitoring, operating and/or controlling of components and/or the entire object is made easier, faster and more efficient and economical, respectively.

These and other objects are achieved by a system for monitoring and/or operating one or more vehicles (or other moving objects), in which each vehicle is assigned an internet address and comprises an interface to the internet via a wireless telecommunication unit. Sensors and/or actuators for monitoring and/or affecting components and/or conditions of the vehicle are connected to the interface, so that a connection between a supervisor station and each vehicle can be established via the internet for evaluating conditions of the related components by way of the sensors and/or actuators.

This solution has several advantages. By monitoring vehicle components and operating conditions during operation of the vehicle, evaluation and prediction of the behavior, load, wear, reliability, life span and remaining time until possible failure is substantially improved. Such evaluation and prediction can further be improved by affecting certain conditions by actuators and observing the resulting reaction of the related components. This not only accelerates development as related above, but also makes route planning easier because failure of a component (or running short of fuel) can be predicted efficiently. In this way, related component(s) can be exchanged in due time and especially on occasion of a normal stop, for example, when picking up or delivering of goods or products, so that extra interruptions of operation of the vehicle for maintenance purposes is largely avoided.

At the supervisor station which can exemplarily take the form of a central station, a remote supervisor of any physical quantity detected by a sensor, as well as an online data analysis which can be conducted via the internet. A remote file transfer of the test results leads to a considerable reduction of the time necessary for testing and checking vehicles and their components during development process. The system has advanced trigger capabilities and is very flexible and easy to adapt on different user demands and situations, but is nevertheless very small and inexpensive to be realized.

BRIEF DESCRIPTION OF DRAWINGS

Further details, features and advantages become apparent from the following description of preferred embodiments of the invention with reference to the drawings, in which shows.

DETAILED DESCRIPTION

Figure 1:
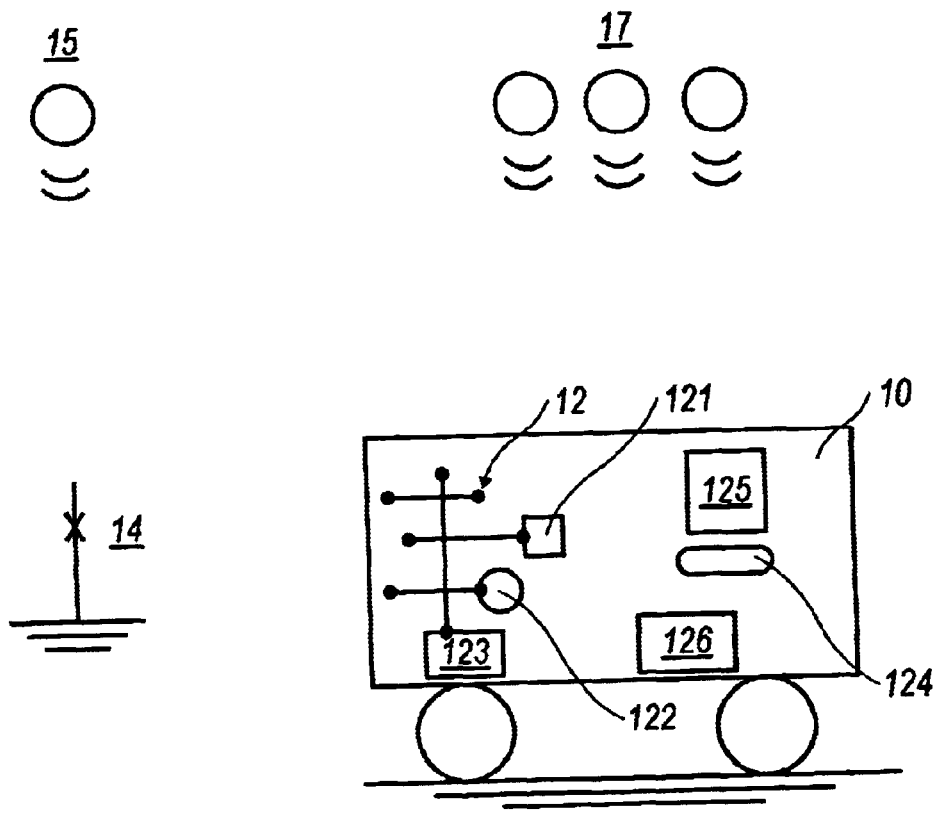
FIG. 1 depicts a first diagram of the components of an inventive system for a vehicle.
Figure 1:
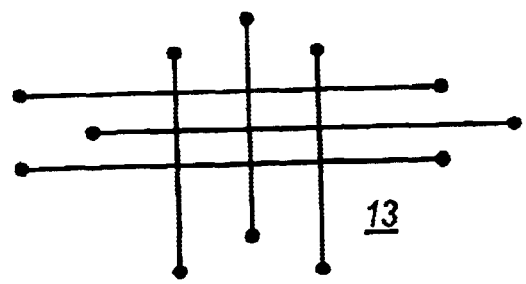
Figure 1:
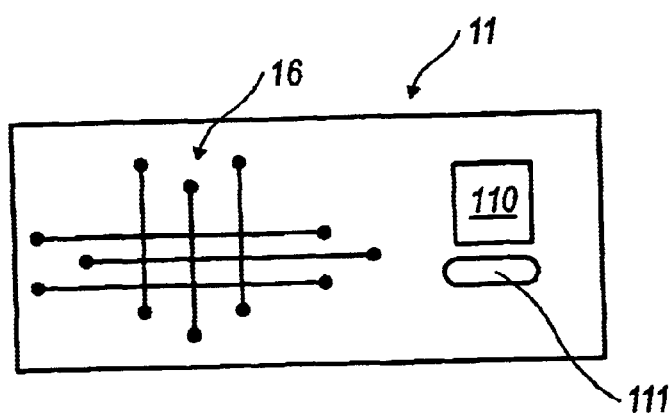

In FIG. 1, the inventive system is shown for the communication of vehicles 10 with a central station 11 which exemplarily includes a computer with keyboard 111 and a display 110. The system allows integration and the making use of the functionality of numerous stand alone networks and other units like one or more in-vehicle busses 12 (or networks which in turn can be of different type, e.g. optical busses), the internet 13 or a WAP (Wireless Application Protocol) or another mobile telecommunication unit 126, a network for mobile telecommunication (GSM) via a cellular area 14 or satellite system 15, an intranet 16 which is an in-house computer network in the central station and which may incorporate the knowledge of networking engineers, or a satellite navigation system 17 like GPS (global positioning system).

The in-vehicle bus 12 itself is connected with sensors 121 for measuring physical quantities and a storage facility 122 for storing these values, actuators 123 for actuating and affecting processes in the vehicle, as well as a computer 124 with keyboard and a display 125. The units within the vehicle constitute a mobile and interactive communication platform.

The inventive system makes use of all these units and facilitates their working together. The system is modularly built up by these units and can be developed continuously in connection with any of the other units, networks or components.

If a user at the central station 11 wants to communicate with one of the vehicles 10, he or she first starts an appropriate computer program or software on the desktop computer 111. This software is preferably a usual web browser or similar software. Then he types the name (or the IP-address) of the vehicle 10 into the program. The name is then translated into an assigned IP-address of the vehicle, preferably by the station's intranet 16, and then transferred, whenever applicable, to the internet 13. If the addressed vehicle 10 is found in the network by searching the related telecommunication unit 126 of the vehicle by means of its telephone-number, a connection between the vehicle and the central station 11 is established via the cellular network which is for example the GSM-network 14 or the satellite system 15 and the user has access to a communication platform of the vehicle. The vehicle can further graphically be located via a linked map site on the web browser of the user. For this purpose, the satellite navigation system 17 (GPS) may be used for evaluating the position of the vehicle by means of a GPS receiver inside the vehicle and transmitting position data to the central station 11 via the WAP system 126.

Figure 2:
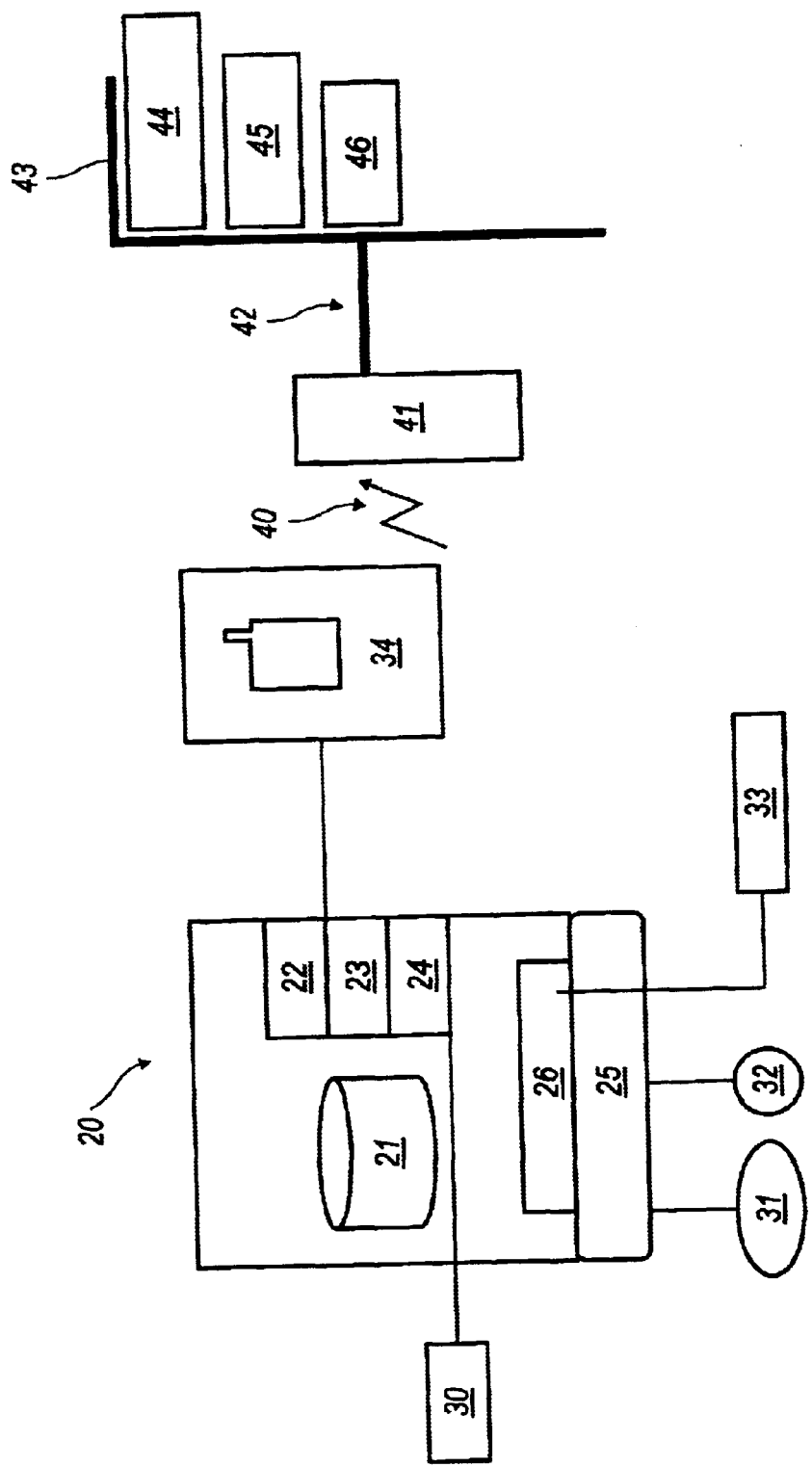
FIG. 2 depicts a second diagram of the components of an inventive system for a vehicle with a mobile communication platform according to a first embodiment.

FIG. 2 shows an alternative configuration of the inventive system with more details. A communication device in the form of the mobile communication platform 20 inside a vehicle comprises a storage 21 for HTML-pages, a FTP-server 22, a HTTP-server 23 and a gateway 24. These units are controlled by an operating system 25 and a triggering and logging application 26. A unit under test 30 is connected via an RS-232/Ethernet interface with TCP/IP (PPP) protocol with the gateway 24. Further, a keyboard with display 31 and a GPS receiver 32 are connected with the operating system 25, while other in-vehicle links or bus systems 33, like JI708/J1587, are connected to the triggering and logging application 26. The FTP-server 22 and HTTP-server 23 are linked via an RS-232/Ethernet interface with TCP/IP (PPP) protocol with a transmitting and receiving means 34 in the form of a cellular GSM or GPRS telecommunication unit or a satellite telecommunication unit which can establish a connection 40 to a modem pool and IP-telephone router 41. This router 41 is connected via Internet or Intranet 42 with a PC-application 43 at the central station which comprises special set up software 44 for any unit under test 30, a triggering and logging application 45 for the setup software and a web browser 46 for the user at the central station. The unit under test 30 may be any component in a vehicle which is accessible by the central station via a homepage generated by the communication platform of the vehicle.

Figure 3:
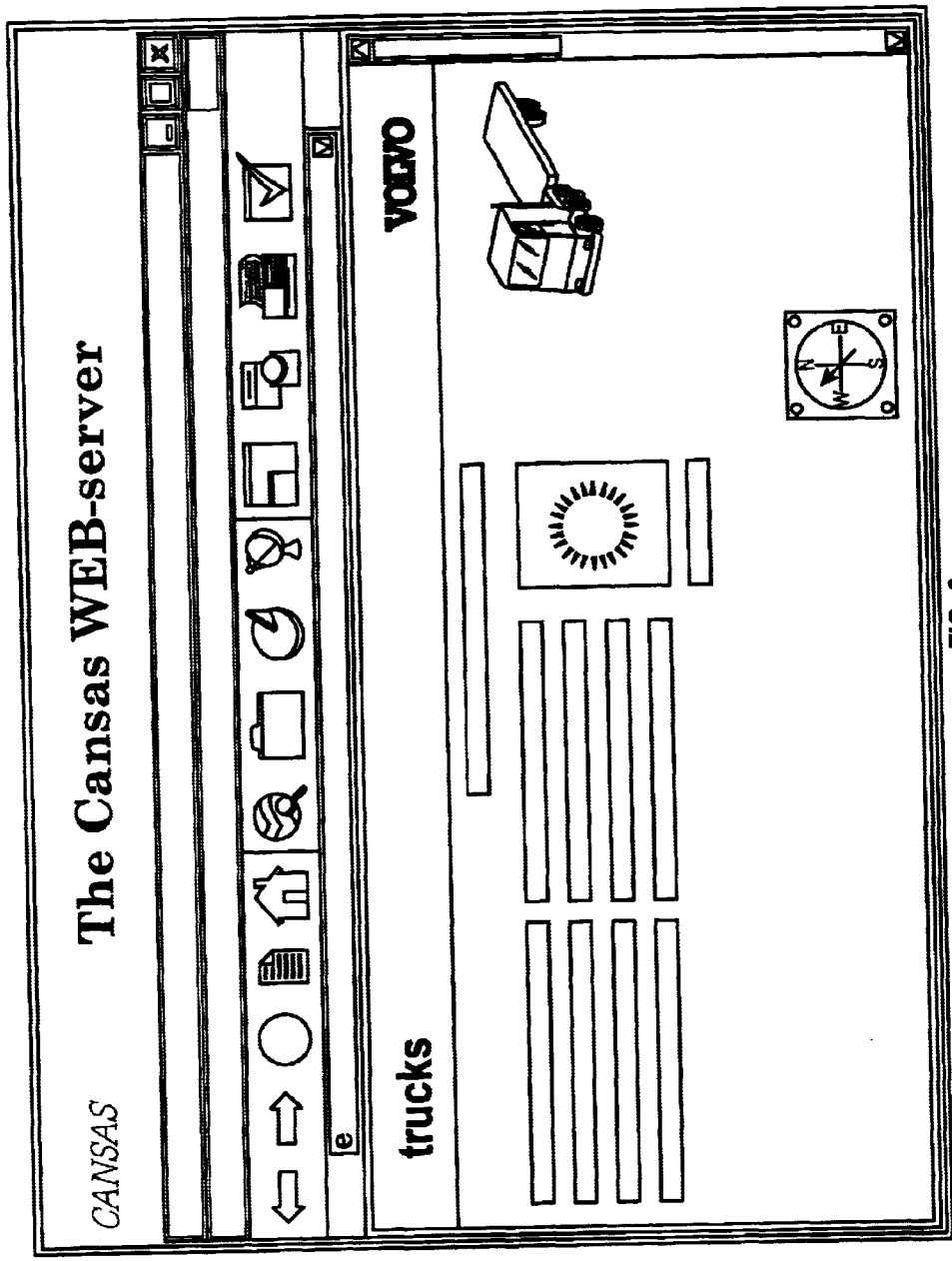
FIG. 3 depicts an Internet displayed homepage as one part of a communication platform.

FIG. 3 shows such a homepage which is presented for the user after communication with the addressed vehicle (or another object) has been established. This homepage is a major part of the exemplary communication platform which further comprises the computer 124 and software for generating the homepage. According to FIG. 3, the homepage contains information and data monitored in connection, for example, with development, test, operation, maintenance, navigation, load or guidance of the vehicle and/or one of its components 30 by means of the sensors 121 and/or actuators 123. Additional data to be monitored can be user defined. All these data-and information are stored in the storage means 122 (FIG. 1) or 21 (FIG. 2) and are accessible for the user for evaluation and any other purpose via the homepage.

Further, the homepage comprises interactive fields or buttons which when activated by a computer mouse of the user, affect actuators or other means in the vehicle. With such actuators, changes of any operation, performance or maintenance parameters, of a test setup or a configuration of a test, or a software configuration in the vehicle may be conducted by the user.

The application of the inventive system in the development process of vehicles has the advantage that by the online communication and online activation of actuators, a considerable part of the lead time for the vehicle testing will decrease due to better supervising, less travel, faster responses to field problems, a much higher efficiency in utilization the test vehicle, a faster way to verify the quality of the test before the vehicle returns, increased availability of test vehicles world wide, fast error diagnostics and fast feedback on test results. In general, there will be a shortened lead time from initiating a test to the fulfilled report, reduced costs and increased quality.

A further advantage resides in the fact that such a remote vehicle testing system enables advanced diagnostics and data logging. This means that problem adapted measurements can be run by the user from the central station 11. Further, by advanced post mortem triggering capabilities, any errors can be trapped. Online data analysis makes the GSM bandwidth no obstacle for file transfers. During time periods of interrupted or inactive connection between a vehicle 10 and the central station 11, the data detected by the sensors are stored in the storage facilities 122 for later access by the user. Finally, the driver of the vehicle may also have access to the homepage or primary information display for initiating diagnostics in case of failure or any other purpose.

In addition, the inventive system offers a complete system for in-vehicle data logging and diagnostics. Its remote capabilities dramatically increase the testing efficiency. The modularity of the system allows the user to adapt the system for any purpose and can also be integrated with other measuring tools. The system can monitor all in-vehicle data (e.g. J1939 and J1587 bus) and all kinds of analogue and digital sensors.

The modules of the system reside in several subsystems. First, there is provided a remote vehicle testing subsystem which monitors the J1587 bus and GPS data with advanced triggering capabilities for example; entering range, level triggering, and using Boolean expressions for combined triggers. It is remotely connected to the central station 11 via a GSM/CDMA/GPRS-network and allows online data analysis. It also includes the computer 124 with a web server for generating the homepage.

Second, the system comprises a high performance data acquisition subsystem which can measure any physical quantity and which comprises the vehicle's internal data bus 12. This subsystem includes the sensors 121, the actuators 123 and a highly advanced triggering and online data analysis functionality (e.g. rain flow/pair analysis, histogram, multi-dimensional analysis, and the like). It can be remotely controlled via the first subsystem. Especially for normal operation, the system offers applications as a common tool for in-vehicle statistic data logging, a "black box" in a vehicle for recreating course of events and also a communication platform for after market diagnostic tools.

The system is as well applicable in normal use of the vehicle and offers advantages for planning routes of vehicles which are guided by a supervisor from a central station, for example at a haulage or transport agency. By connecting to the communication platform of a desired vehicle, the supervisor can extract data of the vehicle which are relevant for planning routes. If the vehicle is for example running in sparsely settled areas, the supervisor would request data about the available fuel quantity, the average fuel consumption, as well as the current position of the vehicle. On the basis of these data, the supervisor is now able to optimize the route with respect to one or more destinations and fuel stations on the way.

Figure 4:
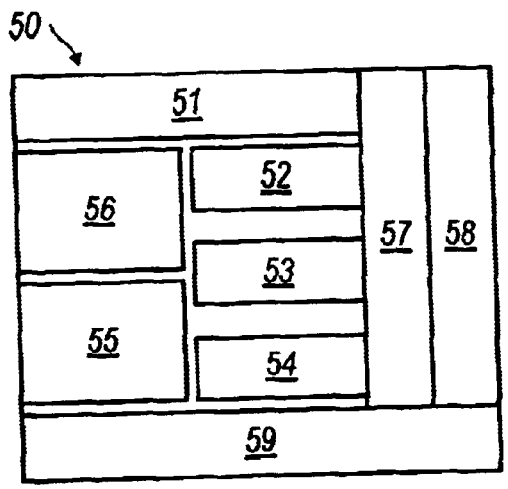
FIG. 4 depicts a second embodiment of the mobile communication platform.

FIG. 4 shows a second modified embodiment of the mobile communication platform (MCP) 50 for collecting and analyzing data, as well as for transmitting and receiving programs and data to and from a central station, respectively. The MCP comprises a gateway 51 for communication with other devices within the vehicle via the in-vehicle bus 12 (FIG. 1). It further comprises a web-server 52, a FTP-server 53 and a telnet unit 54. The MCP is operated by a microprocessor unit 59 with a real time operating system like RTOS and a remote vehicle test application (RVr) 55, as well as other application pro56. For communication with a service center, the gateway 51, the web-server 52, the FTP-server 53 and the telnet unit 54 are connected with a unit 57 for encrypting and decrypting transmitted and received programs and data, respectively, as well as with a PPP-server 58. The MCP 50 is preferably a compact device with standard size for exchangeably mounting inside the vehicle.

The MCP 50 is connected with a keyboard and display 31 (FIG. 2) and via the in-vehicle bus 12 (FIG. 1) with said sensors 121 for measuring physical quantities, operating values and other parameters of the vehicle and has access to the permanent storage 122 (for example a small hard disk) for storing these quantities, values and parameters. Actuators 123 for actuating and affecting processes in the vehicle are also connected with and controlled by the MCP 50. The in-vehicle bus 12 is for example a J1587 bus or a CAN (car area network) bus. Again, also a GPS-receiver 32 (FIG. 2) is connected with the MCP for acquisition and evaluation of position data.

For communication with the central station (e.g. a service center) 11, a mobile telecommunication unit 126 (FIG. 1); 34 (FIG. 2) is provided according to the usual GSM- or UMTS-standard which establishes connection via a network for mobile telecommunication (a cellular network 14 or satellite system 15 according to FIG. 1), the internet 13 and an intranet 16 of the central station 11.

This system is especially adapted for monitoring components and operating conditions of a vehicle by means of said sensors 121, which sensor related values like temperatures, pressures, fluid levels, fuel consumption, positions, movements, velocities, tensions, electrical values, or other detectable values of vehicle components, while the vehicle is traveling remote from the central station. Further, in response to those values, the actuators can be controlled in a desired manner.

For monitoring a certain component or unit of the vehicle, like the gear, the brakes or the motor, generally only those sensor-values are to be evaluated which are relevant for such components. Accordingly, the relevant sensors have to be selected. Further, it is sometimes desired to measure and evaluate those or other values only at a certain incident or at a certain time or in a certain operating condition of the vehicle, so that starting and/or stop conditions have to be defined. Finally, it has to be determined whether the measurement values of the sensors are to be logged in the storage 122 and/or viewed on a homepage of the MCP 50.

Figure 5:
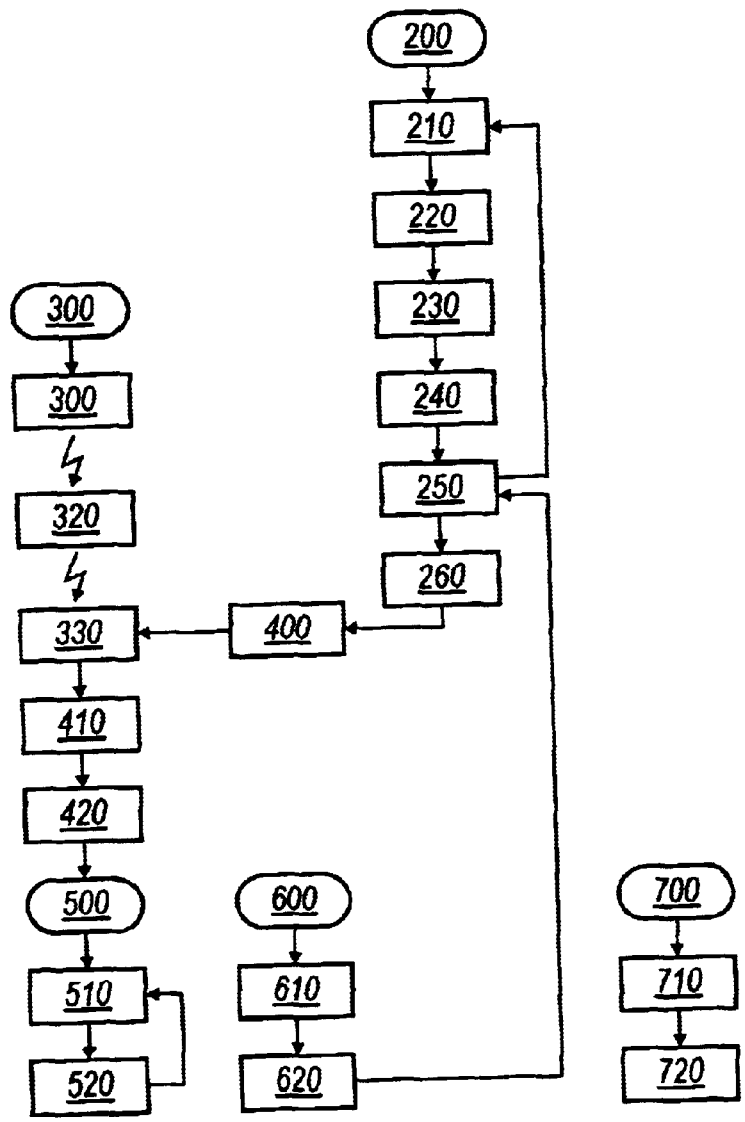
FIG. 5 depicts a flow chart of conducting software setup and monitoring a vehicle.

These determinations are stored in a setup file for setting up the remote vehicle test application (RVT) 55 within the MCP 50. The setup file is created by an authorized administrator by running a RVT trigger setup software at his computer at the central station. This procedure and the functions of the RVT-software system which consists of the remote (first) part 55 in the MCP and a second part for creating and downloading a setup file in the central station are explained below with reference to the flow chart shown in FIG. 5.

After starting the RVT trigger setup software in a step 200, for a first monitoring process T1, the desired source sensors according to the values to be evaluated are selected from a database of all sensors contained in the vehicle in step 210.

Further, in step 220, a start condition is defined by selecting one or more of those sensors, assigning each a threshold value and combining these with Boolean conditions so that if one or more of the sensor values reach the threshold value, the first monitoring process T1 is started.

According to step 230, a stop condition is defined similarly by selecting one or more sensors, assigning each a threshold value and combining these with Boolean conditions so that if one or more of the sensor values reach the threshold value, the first monitoring process T1 is stopped.

In a step 240, it is determined for each of the selected sensors whether the values of the sensors measured after starting and before stopping the monitoring process according to the start and stop condition, respectively, are to be logged in the permanent storage 122 and/or viewed on a homepage of the MCP, generated by the web server 52.

According to step 250, the amount of measurement values of each sensor can be reduced by configuring a reduction condition. This condition determines for example that only every 10th value is logged and/or viewed or that only the peak value and/or the mean value out of e.g. 10 values is logged and/or viewed. Further, the condition can be determined to log and/or view the sum of, for example, ten values.

Then, a second monitoring process T2 is defined by repeating the steps 210 to 250 for another combination of sensors.

On the basis of these selections and inputs, the setup software generates a related setup file which is encrypted and compressed if necessary and intermediately stored in a memory according to step 260 until it is downloaded to the related MCP for setting up the RVT-application 55.

For implementing the setup file at a target-vehicle, which shall be monitored or controlled, a connection between the central station and the MCP contained in this vehicle is established by the administrator at the service station according to the principles explained with reference to FIGS. 1 and 2.

According to step 300, the administrator starts the RVr-software on his computer and inputs the address of the MCP inside a target-vehicle. This address is the name of the MCP which is translated into an IP-number according to step 310 and transmitted via an intranet and the internet to a router which according to step 320 converts the IP-number into a telephone number of the mobile telecommunication unit 126 (FIG. 1) or 34 (FIG. 2) included in the target-vehicle and establishes a call using this telephone-number via a mobile or satellite telecommunication network 14, 15 (FIG. 1) to the MCP of the target-vehicle according to step 330.

If the connection has been established and authorization of the administrator has been verified, the setup file is downloaded according to step 400 and decrypted in the cryption/decryption unit 57 (and if necessary, decompressed) according to step 410. According to step 420, the setup file is then implemented by the microprocessor unit 59 and the RTOS in the RVT-application which then starts generating its homepage, and the connection between the central station and the MCP can be terminated.

If the RVT-software of the RVT-application itself has to be updated or changed, a download from the central station is conducted accordingly as described above. However, before installing the new software, the old software is intermediately stored in a memory and then the new software is implemented into the RVF-application 55. If the new RVT-software works properly, the old software is deleted. Otherwise, the old software is implemented again by the by the microprocessor unit 59 and the RTOS.

When the vehicle is running in remote areas and if it is desired to monitor the vehicle according to the defined first and second monitoring process T1 and T2, a supervisor of the vehicle starts an internet browser on his computer and inputs the name of the related MCP. After connection has been established according to the above steps 310 to 330, he activates the related processes T1 and T2 via the browser according to step 500 by pressing a related button on the home page so that a start command is transmitted to the RVT application. Now, the RVT application monitors the related sensors and waits for the occurrence of the start conditions for starting the monitoring processes T1 and T2 as defined above according to steps 210 to 250.

If now the RVT application detects that the defined start condition occurs, the related monitoring process starts according to step 510 and the measurement values of the selected sensors are logged on the permanent memory 21 (FIG. 2) and/or made available for being viewed on a home page of the MCP according to the determinations in step 240, as well as in a reduced form according to the configuration in step 250.

If the RVT application detects that the defined stop conditions occur, the measurement values of the selected sensors are no longer considered and the related monitoring process is terminated (step 520) until the start condition occurs again.

For evaluating the sensor signals the supervisor connects to the vehicle's MCP main homepage which is held in the web server 52 of the related MCP according to step 600.

The main homepage comprises several sub-pages with various contents regarding measurement history and configuration.

A first sub-page indicates general information about an identification number of the MCP, a name of the process, the last update and some measurement information like a short description, the time when the last measurement was started and other predetermined information. A second sub-page indicates the MCP signals which have been selected as to be viewed on the homepage according to the above step 240, i.e. the actual measurement values of the sensors. On a third sub-page, J1587 error codes are indicated which have been issued since the start condition occurred. Alternately, only the last ten fault codes are showed on this sub-page.

Finally, a fourth sub-page shows the vehicle position, which is evaluated by the GPS receiver 32 (FIG. 2), on a map, as well as for example the actual time and heading, speed and altitude of the vehicle.

According to step 610, the supervisor can upload the measurement values of the sensors which have been selected to be logged in the permanent memory 21 of the MCP according to the above step 240 via the mobile telecommunication system and the internet as explained with reference to the above steps 300 to 330. For saving time, the measurement values are preferably compressed in a usual manner. Further, the data can be encrypted before uploading as explained with reference to the above step 260. After uploading, decompressing and decrypting, the supervisor can generate a graphical representation of the values for a better interpretation and evaluation.

Further, according to step 620, the supervisor can reconfigure the reduction condition configured in the above step 250 if, for example, certain test results require a modified evaluation of the sensor-signals.

If monitoring of the vehicle is no longer desired, the processes T1 and T2 can be deactivated after establishing connection to the home page of the MCP as well. For this purpose, preferably a password is supplied, if it is desired that only the administrator (or another authorized person) is able to deactivate the processes.

Finally, the MCP itself is provided with a "fault-" button to be pressed by the driver of the vehicle according to step 700, if he notices any unusual behavior or noise of the vehicle or one of its components. When pressing this button, a predetermined test routine according to step 710 is activated by the RVT application by which measurement values and the behavior of predetermined sensors as well as the behavior of the driver with respect to the way he drives the vehicle are logged in the permanent memory 21 for uploading and diagnostic purposes according to step 720 by the supervisor according to the above steps 600 and 610. This makes fault-detection faster and easier. The test routine can be activated independently of any active monitoring process T1 and T2 and is deactivated by the driver when the unusual behavior or noise disappears.

Further, fault detection can be conducted by maintenance personnel at a central station by connecting to the MCP of the related vehicle and making a remote fault polling by uploading fault codes of related components which indicate the condition, behavior and status of the component.

One preferred application of this data acquisition and evaluation is testing and monitoring of vehicle components and operating conditions during the development of a vehicle.

However, also in normal operation of the vehicle, the inventive method offers significant advantages for the planning of routes with respect to the prediction of wear, failures and defects of any components in dependence of the driving characteristics and consequently for the planning of necessary maintenance works and intervals.

If for example a profile of the driving characteristic of the vehicle with respect to the frequency and amount of braking is established, a prediction can be made on the basis of a sensor signal sensing the brake pads as to how long the vehicle can be driven before the brake pads have to be exchanged. The same applies similarly for other components which are subjected to wear, especially in dependence of certain conditions relating to the surroundings and/or the way the driver operates the vehicle.

Considering such predictions, a component which is expected to be defective within the near future can precautionarily be exchanged, for example, during a stop for taking fuel or oil. By evaluation of the appropriate sensor signals, the necessity of returning the vehicle to a central service station for maintenance purposes can largely be avoided. This in turn allows more economic utilization of the vehicle.

The inventive system and method is as well applicable for other moving objects like airplanes and ships which are equipped with appropriate sensors and actuators for monitoring and/or control. Further, even stationary plants and facilities can be monitored and controlled using this inventive system and according to the inventive methods described herein.

The RVT application software is preferably a computer program and is stored on a computer usable medium for installation on a computer and then downloaded to the MCP.

The invention is as well applicable for testing, checking, monitoring, operating and/or controlling of stationary objects like facilities, plants or other objects especially in areas remote from any central or service station.

What is claimed is:

1. A system for monitoring and operating at least one moving object comprising:
   at least one moving object that is assigned an internet address and has an interface to the internet via a wireless telecommunication unit;
   at least one of a sensor for monitoring and an actuator for affecting components and conditions of said at least one moving object that is connected to said interface; and
   a connection between a supervisor station and said at least one moving object established via the internet for evaluating object conditions by means of said sensors and said actuators.

2. The system according to claim 1, wherein each object further comprises:
   a communication device for collecting and analyzing data, and for transmitting and receiving programs and data to and from said supervisor station via the internet.

3. The system according to claim 2, further comprising:
   said communication device being connected with said sensors and said actuators via an in-object buss; and
   a storage device and a computing device, said computing device including a test application program for generating a homepage that represents output signals of said sensors and that actuates said actuators via the supervisor station.

4. A method for conducting at least one of the operations of testing, operating, controlling, observing and monitoring at least one remote object via at least one supervisor station comprising:
   providing a system for monitoring and operating at least one moving object that is assigned an internet address and has an interface to the internet via a wireless telecommunication unit, at least one of a sensor for monitoring and an actuator for affecting components and conditions of said at least one moving object that is connected to said interface, and a connection between a supervisor station and said at least one moving object established via the internet for evaluating object conditions by means of said sensors and said actuators;
   establishing a connection from said supervisor station to said at least one object via the internet and one of a mobile system and a satellite telecommunication system; and
   selecting measurement data from said at least one sensor for display on a home page or for uploading to the supervisor station for evaluating sensed conditions of the object.

5. The method according to claim 4, wherein selection between said at least one of a sensor for monitoring and an actuator for affecting components and conditions of said at least one moving object is conducted by downloading a setup file for configuration of a test application program for running predetermined monitoring processes.

6. The method according to claim 4, further comprising:
   actuating components of said at least one moving object by means of actuators in said object in response to measured values from said at least one sensor regarding sensed object conditions.

7. The method according to claim 6, wherein selection between said at least one of a sensor for monitoring and an actuator for affecting components and conditions of said at least one moving object is conducted by downloading a setup file for configuration of a test application program for running predetermined monitoring processes.

8. The method according to claim 4, further comprising:
   controlling said system for monitoring and operating at least one moving object utilizing a computer program including computer program code configured to run on a programmable microprocessor carried on said at least one moving object.

9. The method according to claim 8, further comprising:
   adapting said computer program code to be downloaded to said programmable microprocessor via the internet.

10. The method according to claim 8, further comprising: adapting said computer program code to upload and download data via the internet in response to polling from said supervisor station.

11. A system for monitoring and controlling at least one remotely located vehicle, via the internet, from a supervisor station, said system comprising:
    a supervisor station having a computing device upon which monitoring and control protocols reside for related vehicles, said supervisor station being connectable to an internet based inter-communication system;
    a vehicle configured for remote travel from said supervisor station without physical connection thereto, said vehicle carrying a computing device connectable to said computing device of said supervisor station via a wireless telecommunication unit and the internet, and said vehicle being assigned an internet-styled IP address for facilitating internet-based communication with said supervisor station;

a sensor located on said vehicle and configured to detect information for transmission to said supervisor station via the internet regarding vehicle conditions.

12. The system according to claim 11, further comprising:

a data storage unit carried upon said vehicle and configured to store detected information from said sensor for transmission to said supervisor station.

13. The system according to claim 11, further comprising:

an actuatable device carried upon said vehicle and configured to react to internet-transmitted commands from said supervisor station.

14. The system according to claim 11, further comprising:

a screen display adapted to present a homepage-styled representation of system characteristics.

15. The system according to claim 11, further comprising:

a user input device in communication with said supervisor station for permitting a user to input control commands that are visually displayed on said screen display and communicated to said vehicle as a performance-change command.

16. The system according to claim 11, further comprising:

said computing device of said supervisor station and said computing device of said vehicle having a joint capability to prescribe maintenance procedures to be undertaken during regularly scheduled vehicle stops.

17. The system according to claim 11, further comprising:

said computing device of said supervisor station and said computing device of said vehicle having a joint capability to prescribe brake system maintenance to be undertaken during a future scheduled vehicle stop.

18. The system according to claim 11, further comprising:

said computing device of said supervisor station and said computing device of said vehicle having a joint capability to prescribe fuel stops for the vehicle while said vehicle is remotely traveling away from said supervisor station.

19. The system according to claim 11, further comprising:

said computing device of said supervisor station and said computing device of said vehicle having a joint capability to initiate test programs during new vehicle program testing procedures.

20. The system according to claim 11, further comprising:

said computing device of said supervisor station and said computing device of said vehicle having a joint capability to modify test programs responsive to sensed information during new vehicle program testing procedures.

* * * * *